United States Patent [19]
Woodling

[11] 3,742,979
[45] July 3, 1973

[54] ROTARY VALVE DEVICE HAVING A PLURALITY OF CONTROLLED WORKING PASSAGES

[76] Inventor: George V. Woodling, 22077 Westlake Road, Rocky River, Ohio 44116

[22] Filed: Mar. 2, 1972

[21] Appl. No.: 231,106

[52] U.S. Cl........ 137/625.24, 137/625.47, 251/175, 251/192
[51] Int. Cl............................................. F16k 5/18
[58] Field of Search.................... 251/175, 180, 192, 251/304; 137/625.21, 625.22, 625.24, 625.46, 625.47

[56] References Cited
UNITED STATES PATENTS

| | | | |
|---|---|---|---|
| 1,055,781 | 3/1913 | Mitchell et al................. | 137/625.21 |
| 1,063,295 | 6/1913 | Sheldon...................... | 137/625.21 X |
| 2,477,590 | 8/1949 | Ferwada et al. ............... | 137/625.21 |
| 3,592,233 | 7/1971 | Woodling...................... | 137/625.21 |
| 3,696,710 | 10/1972 | Ortelli....................... | 137/625.21 X |

Primary Examiner—William R. Cline
Attorney—George V. Woodling et al.

[57] ABSTRACT

Rotary valve device including stationary valve body means having stationary valve face means and rotary valve means having rotary valve face means sealingly engaging said stationary valve face means. Housing means surrounds said rotary valve means and defines therewith external fluid chamber means. Said rotary valve means has internal fluid chamber means and has a plurality of selectable operating positions with respect to said stationary valve body means. Actuating means is provided for actuating said rotary valve means from one selectable position to another. Said rotary valve means in one of said selectable positions blanking flow of fluid between said stationary valve face means and said rotary valve face means. Said stationary valve body means has at least one fluid port means therein. Said stationary valve face means and said rotary valve face means have registerable fluid passage means for selectably connecting said external and internal fluid chamber means in communication with said fluid port means.

12 Claims, 16 Drawing Figures

PATENTED JUL 3 1973 3,742,979

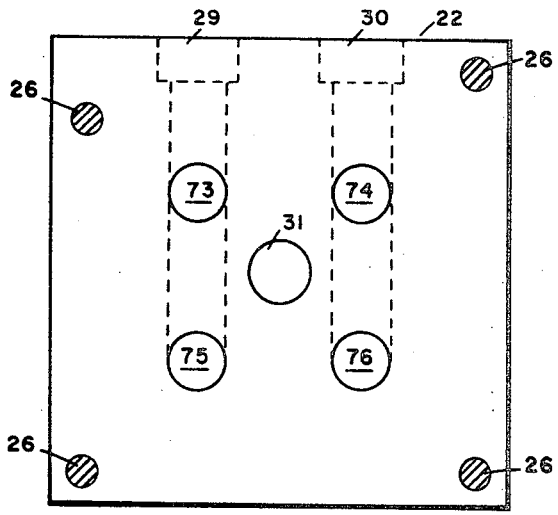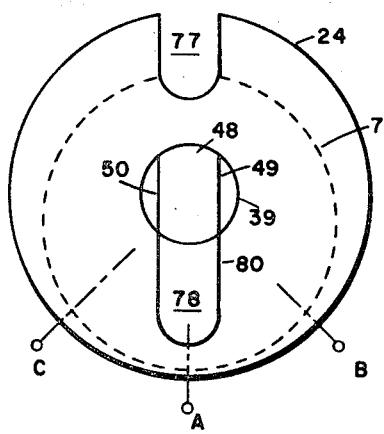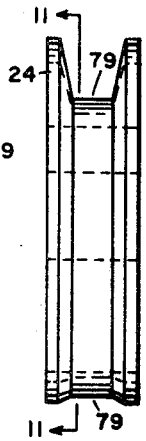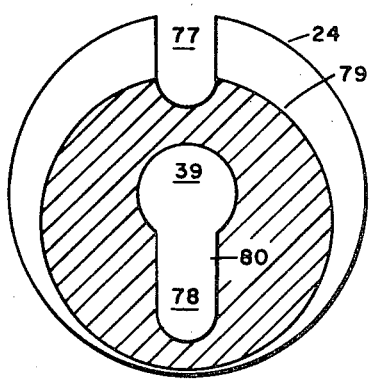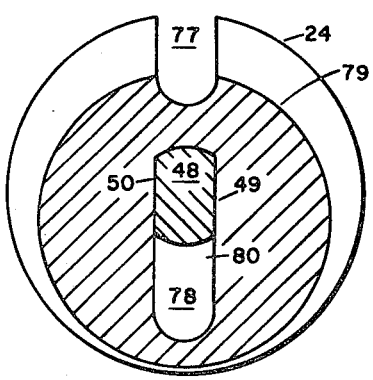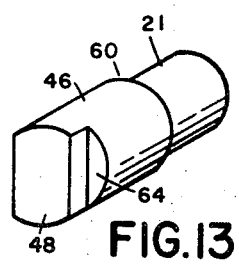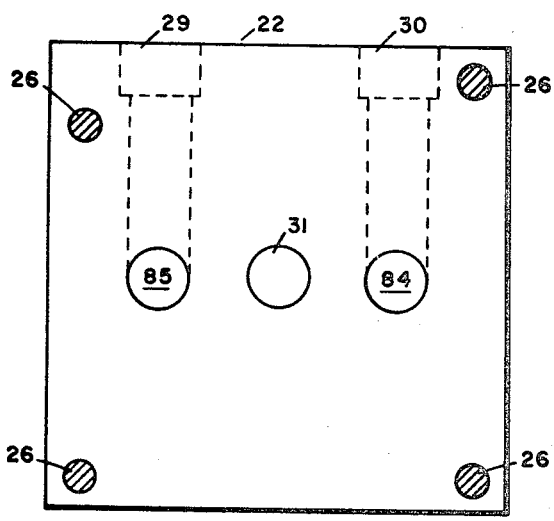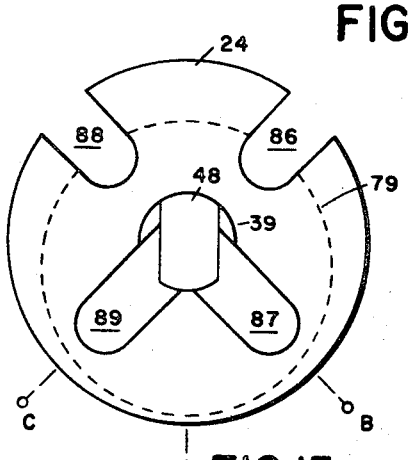

valve 24 operates equally well regardless of which fluid chamber is pressurized.

The shaft 21 is journalled in a cylindrical bearing surface 40 provided in the housing and extends through a central opening 45 in the bushing 23 and has a cylindrical body portion 46 which fits into a central pilot recess 47 in the rotary valve 24 for rotatively supporting same within the internal wall 36 of the counter-bore in the housing 20. The central pilot recess 47 has two opposed bottom segmental walls which define a noncircular opening having substantially two parallel sides 49 and 50. The cylindrical body portion 46 of the shaft 21 is provided with a non-rotative boss 48 having flat side walls terminating in segmental stepped edges 64. The flat side walls of the boss 48 fit between the two substantially parallel sides 49 and 50 of the rotary valve 24 for actuating same upon operation of the handle 25. As seen best in FIG. 2, the sahft 21 is provided with a shoulder 60 for engaging the reaction wall 37, whereby the shaft is secured against axial movement outwardly of the housing. The non-rotative boss 48 makes a slidable axial connection with the two substantially parallel sides 49 and 50, and to provide for this axial connection a small axial clearance 41 may be provided between the stepped edges 64 of the shaft 21 and the bottom segmental walls of the pilot recess 47 in the rotary valve 24 which accommodates for axial tolerance in mounting the shaft 21 relative to the rotary valve.

As shown in FIGS. 2 and 5, the bushing 23 has generally an H-shaped cross-section and comprises a rear flange 43 and a front flange 44 interconnected by a cross bar 42. The bushing 23 may be held against rotation by a dowel pin 61 which fits into a hole 62 in the reaction wall 37. The rear flange 43 has a braod annular shallow groove 63 defined by an outer annular band 66 and an inner annular band 67 which make a metal-to-metal fluid seal with the reaction wall 37 to define therebetween a fluid cavity 68. The rear flange 43 is rendered axially flexible by the broad groove 63 and operates to resiliently urge the rotary valve 24 against the stationary valve body 22 to prevent clearance leakage therebetween. The rear flange 43 is also provided with two small holes 69 and 70 which provide for restricted flow of fluid into and out of the fluid cavity 68. Thus, pressurized fluid in the annular external fluid chamber 38 on the outside of the annular cross-bar 42 may flow through the small opening 70 into the fluid cavity 68 and thence outwardly therefrom through the small opening 69 into the space on the inside of the annular cross-bar 42, whereupon the fluid may then flow to exhaust into the central internal fluid chamber 39 of the rotary valve 24. The restricted flow of the fluid into and out of the fluid cavity 68 causes the pressure therein to be of a reduced amount. This reduced pressure acts against the rear flange 43 and produces a piston effect to hydraulically constrain the rotary valve 24 against the stationary valve body 22 to prevent clearance leakage. It is found that the clearance leakage between the stationary valve body 22 and the rotary valve 24 causes a hydraulic separating force which tends to urge the rotary valve axially away from the stationary valve body 22. This hydraulic separating force is opposed by the piston effect of the bushing, whereby a resultant force may always be provided to urge the rotary valve against the stationary valve body to reduce the clearance leakage. Accordingly, the bushing 23 operates as a fluid responsive means to oppose the separating force incident to the clearance leakage between the stationary valve body and the rotary valve.

The rotary valve 24 may be characterized as an outside-inside valve, in that there is pressurized fluid around the outside thereof and exhaust pressure on the inside, or vice versa. The rotary valve is thus hydraulically balanced in an axial direction by the bushing and in a radial direction by the outside-inside construction. The outside-inside construction of the rotary valve is also basic to the operation of the bushing (piston-effect) which eliminates the necessity of thrust bearings to axially support the rotary valve relative to the stationary valve body.

FIGS. 1, 2, 3 and 4 illustrate a four-way valve arrangement which is further detailed in FIGS. 5 to 16, wherein it is observed in FIG. 8 that the stationary valve body 22 has four valve orifices 73, 74, 75 and 76 and the rotary valve has two valve orifices 77 and 78, see FIG. 9. The two stationary valve orifices 73 and 75 are in constant fluid communication with the fluid port 29 and the two stationary valve orifices 74 and 76 are in constant fluid communication with the fluid port 30. The rotary valve orifice 77 is in constant fluid communication with the external fluid chamber 38 and the rotary valve orifice 78 is in constant fluid communication with the internal fluid chamber 39. To provide full flow access to the rotary valve orifice 77, the outside of the rotary valve 24 may be provided with an external channel 79 eccentrically machined therearound, see FIGS. 9 to 12. The rotary valve orifice 77 constitutes an external radial slot, milled all the way across the rotary valve and is in fluid communication with the external channel 79. Full flow access to the rotary valve orifice 78 may be provided by an internal radial slot 80, milled all the way across the rotary valve from the internal fluid chamber 39 to the orifice, see FIGS. 9, 11 and 12. The milled slot 80 includes the two substantially parallel sides 49 and 50 which define the noncircular opening into which the non-rotative boss 48 fits. It is to be noted that the rotary valve is of such a construction that it may be entirely machined from a piece of bar stock without resorting to a cored casting.

In operation, the rotary valve 24 has a closed selectable position and first and second open selectable positions, see FIG. 9, where position A is the closed position, and positions B and C are respectively the first and second open selectable positions. In position B, the rotary valve orifice 77 is in registration with the stationary valve orifice 73, whereby pressurized fluid may flow outwardly of the fluid port 29 to the cylinder, and the rotary valve orifice 78 is in registration with the stationary valve orifice 76, whereby exhaust fluid from the opposite side of the cylinder may flow into the fluid port 30 and thence to the internal fluid chamber 39 and then to the sump 27 through the fluid port 31. In position C, the rotary valve orifice 77 is in registration with the stationary valve orifice 74 and the rotary valve orifice 78 is in registration with the stationary valve orifice 75, whereby the flow of fluid to and from the cylinder is reversed from that of position B. In position A, the rotary valve 24 blanks flow of fluid to and from the cylinder. This four-way valve arrangement may be readily converted into a three-way valve arrangement by screwing a plug 83 of FIG. 16 into either one of the two fluid ports 29 or 30 of FIG. 8. Thus, in a three-way valve arrangement only one of the two fluid ports 29 and 30 is operative.

ROTARY VALVE DEVICE HAVING A PLURALITY OF CONTROLLED WORKING PASSAGES

BACKGROUND OF THE INVENTION

My invention is directed to a rotary disc valve which may be rotatively supported by a shaft and actuated from one position to another relative to a stationary valve. My invention features an outside-inside rotary valve structure and thereby eliminates the necessity of thrust bearings for axially supporting the rotary valve relative to the stationary valve. Another advantage of the outside-inside rotary valve structure is that the rotary valve itself need not be made with cored interconnecting ducts which usually require that the rotary valve be made of a cored casting. Still another advantage results from the fact that my rotary valve may be constrained against the stationary valve by hydraulic or resilient means to prevent clearance leakage.

Accordingly, it is an object of my invention to eliminate the necessity of thrust bearings.

Another object is the provision of an outside-inside rotary disc valve which may be readily machined.

Another object is to hydraulically and resiliently urge the rotary valve in an axial direction against the stationary valve to prevent clearance leakage.

Another object is the provision of a three-way and a four-way valve which may be readily converted from one to the other.

SUMMARY OF THE INVENTION

My invention constitutes a rotary valve device including stationary valve body means having stationary valve face means, rotary valve means having rotary valve face means sealingly engaging said stationary valve face means, housing means surrounding said rotary valve means and defining therewith external fluid chamber means, said rotary valve means having internal fluid chamber means, said rotary valve means having a plurality of selectable positions with respect to said stationary valve body means, actuating means for actuating said rotary valve means from one selectable position to another, said rotary valve means in one of said selectable positions blanking flow of fluid between said stationary valve face means and said rotary valve face means, said stationary valve body means having at least first fluid port means therein, said stationary valve face means and said rotary valve face means having registerable fluid passage means for selectively connecting said external and internal fluid chamber means in communication with said fluid port means.

Other objects and a fuller understanding of the invention may be had by referring to the following description and claims, taken in conjunction with the accompanying drawings in which:

FIG. 8 is a view taken along the line 8—8 of FIG. 2, showing the face of the stationary valve against which the rotary valve sealingly engages, and illustrating four stationary valve orifices;

FIG. 9 is a view taken along the line 9—9 of FIG. 2, showing the front face only of the rotary valve which sealingly engages the stationary valve face in FIG. 8 and illustrating two rotary valve orifices;

FIG. 10 is a view looking toward a side of the rotary valve in FIG. 9;

FIG. 11 is a cross-sectional view of the rotary valve, taken along the lines 11—11 of FIG. 10;

FIG. 12 is a cross-sectional view of the rotary valve, taken along the line 12—12 of FIG. 2, and illustrating a cross-section of a terminal portion of an actuating shaft disposed to fit within the rotary valve;

FIG. 13 is a representation of the actuating shaft;

FIG. 14 is a modified view of FIG. 8, illustrating two stationary valve orifices;

FIG. 15 is a modified view of FIG. 9, illustrating four rotary valve orifices; and FIG. 16 is a view of a threaded port plug.

DESCRIPTION OF THE PREFERRED EMBODIMENT

Figure 1:
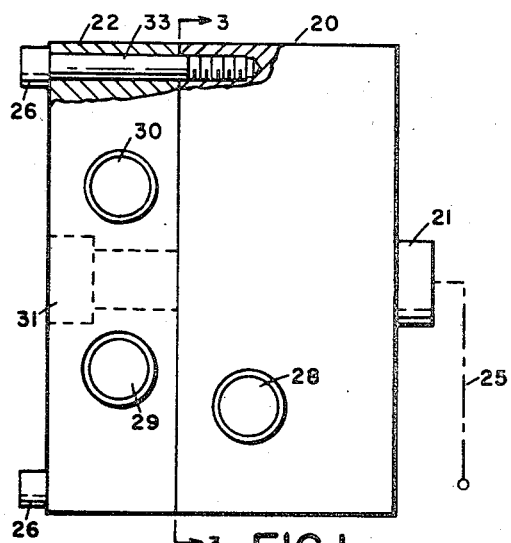
FIG. 1 is a top plan view of a rotary valve device embodying the features of my invention, and illustrates four fluid ports.

My rotary valve device comprises generally a rotary valve housing 20, an actuating shaft 21 rotatively mounted in the housing, a stationary valve body 22 connected to the left-hand end of the housing by cap screws 26 which extend through holes 33, a bushing 23 mounted in the housing, and a rotary valve 24 axially mounted between the stationary valve body 22 and the bushing 23. The rotary valve 24 is rotatively supported by the shaft 21 and is adapted to be actuated from one selectable position to another by a handle represented by a dash-dot line 25. For simplicity of the drawings, the static and the shaft seals are not shown and all wear parts are made of bearing or hardenable material to give long life.

Figure 2:
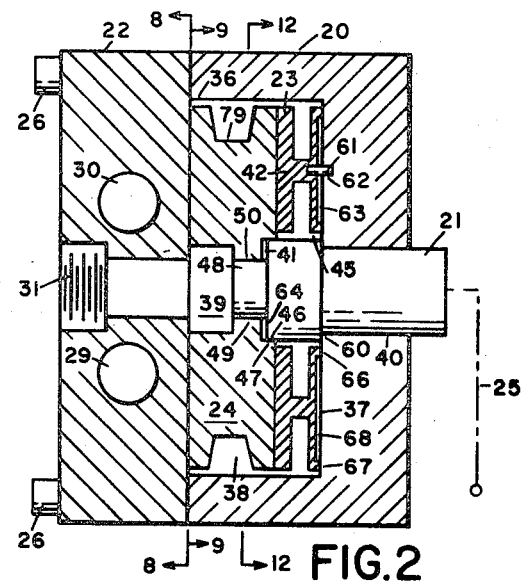
FIG. 2 is a longitudinal cross-sectional view, taken along the line 2—2 of FIG. 3.
Figure 3:
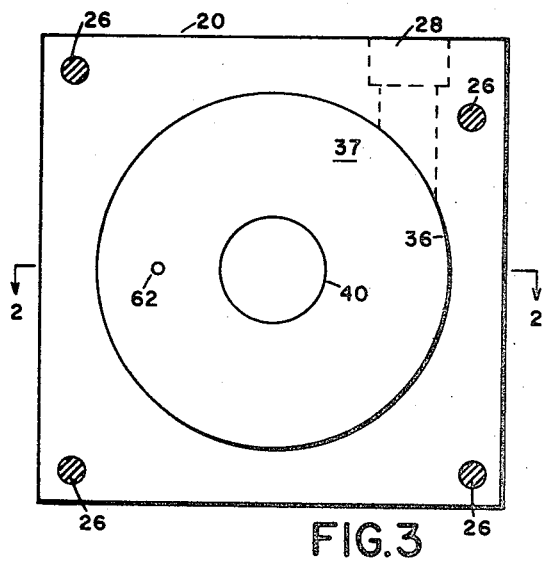
FIG. 3 is a view taken along the line 3—3 of FIG. 1, showing an end view of the rotary valve housing without the rotary valve being mounted therein.
Figure 4:
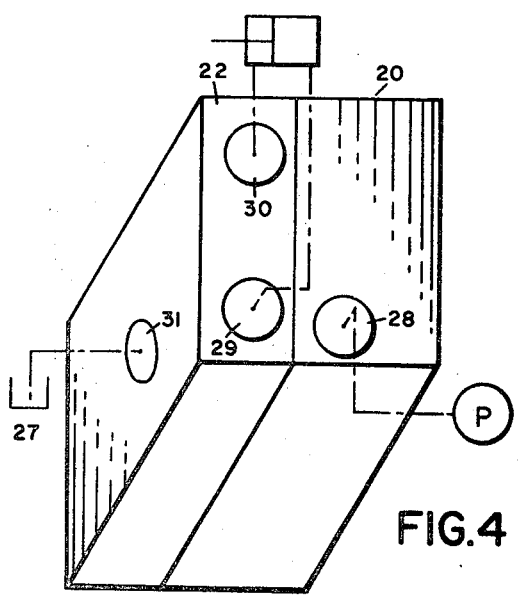
FIG. 4 is a representation showing how the four fluid ports may be connected as a four-way valve for supplying fluid to and from a work cylinder.
Figure 7:
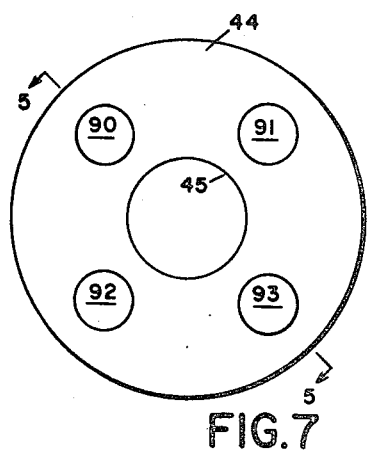
FIG. 7 is a left-hand side (front) view of the bushing in FIG. 5.
Figures 5, 6:
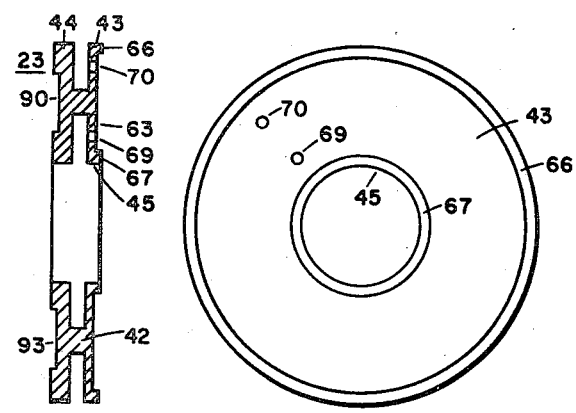
FIG. 5 is a cross-sectional view of my bushing, taken along the line 5—5 of FIG. 7 which hydraulically and resiliently constrains the rotary valve against a stationary valve to prevent clearance leakage.
FIG. 6 is a right-hand side (rear) view of the bushing in FIG. 5.

As shown in FIGS. 1-4, the housing 20 has a fluid port 28 and the stationary valve body 22 has three fluid ports 29, 30 and 31. This arrangement constitutes a four-way valve and may be used to direct fluid to and from a cylinder, diagrammatically illustrated in FIG. 4, wherein the fluid port 28 is preferably connected to a pump and the fluid port 31 is connected to a sump 27. The bushing 23 and the rotary valve 24 are mounted in a counter-bore in the housing defined by an annular wall 36 and a bottom or reaction wall 37 spaced substantially parallel to and axially from the stationary valve body 22. The annular wall 36 is spaced outwardly of the bushing 23 and the rotary valve 24 to provide an annular external fluid chamber 38 therearound which is in constant fluid communication with the fluid port 28, see FIG. 3. The inside of the rotary valve 24 is provided with an internal fluid chamber 39 which is in constant fluid communication with the fluid port 31. Preferably, the fluid port 28 is connected to the pressurized source, whereby the shaft 21 is free from exposure to high pressure which eliminates the necessity for sealing the shaft for high pressure. However, the rotary In FIGS. 14 and 15, the stationary valve body 22 has two valve orifices 84 and 85 and the rotary valve has four valve orifices 86, 87, 88 and 89. In position A, fluid flow through the fluid ports are blanked. In position B, the rotary valve orifices 87 and 88 are respectively in registration with the stationary valve orifices 84 and 85, and in position C, the rotary valve orifices 86 and 89 are respectively in registration with the stationary valve orifices 84 and 85. Accordingly, it is to be noted that in position C, the flow of the fluid through the fluid ports 29 and 30 is reversed from that in position B, wherein the arrangement constitutes a four-way valve, and wherein it may be converted into a three-way valve by screwing the plug 83 of FIG. 16 into either one of the two fluid ports 29 or 30 in FIG. 14.

In my invention, the rotary valve 24 is axially balanced hydraulically between the stationary valve body 22 and the front flange 44 of the bushing 23. To this end, the rotary valve orifices 77 and 78 in FIG. 9 extend from one side of the rotary valve 24 across to the other side, whereby both sides of the rotary valve are identical. Also, the front flange 44 of the bushing 23 is provided with four shallow recesses 90, 91, 92 and 93, which respectively have an area substantially the same as the four stationary valve orifices 73, 74, 75 and 76 and which are disposed substantially directly opposite to them. Accordingly, in all positions of the rotary valve, the hydraulic action on both sides of the rotary valve is the same, with the result that the rotary valve 24 is disposed to be hydraulically balanced between the stationary valve body 22 and the front flange 44 of the bushing. For the valve arrangement shown in FIGS. 14 and 15, the front flange for the bushing is provided with only two shallow recesses to hydraulically match the two stationary valve orifices 84 and 85, otherwise the bushing 23 remains the same.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the construction and the combination and arrangement of parts may be resorted to without departing from the spirit and the scope of the invention as hereinafter claimed.

What is claimed is:

1. Rotary valve device including stationary valve body means having stationary valve face means, rotary valve means having first and second sides, said first side including rotary valve face means sealingly engaging said stationary valve face means, housing means surrounding said rotary valve means and defining therewith external fluid chamber means, said housing means having housing fluid port means in constant communication with said external fluid chamber means, said stationary valve body means having at least first and second valve fluid port means, said stationary valve face means having at least first and second fluid passage orifice means respectively in constant communication with said first and second valve fluid port means, said rotary valve means having internal fluid chamber means in constant communication with said second fluid passage orifice means and said second valve fluid port means, said rotary valve means having first, second and third selectable positions with respect to said stationary valve body means, actuating means for actuating said rotary valve means from one selectable position to another, said rotary valve means in said second selectable position blanking flow of fluid between said stationary valve face means and said rotary valve face means, said rotary valve means in said first selectable position having first valve fluid passage means in registration with said first fluid passage orifice means to connect said housing fluid port means and said first valve fluid port means in communication with each other and in said third selectable position having second valve fluid passage means in registration with said second fluid passage orifice means to connect said first and second valve fluid port means in communication with each other, said housing means having reaction wall means, said second side of said rotary valve means including rotary reaction face means facing but spaced from said reaction wall means, and bushing means disposed between said reaction wall means and said rotary reaction face means, said bushing means including first and second end flange means interconnected by an annular cross-bar, one of said flange means being resilient and being under axial restraint to urge said rotary valve face means sealingly against said stationary valve face means.

2. The structure of claim 1, wherein said stationary valve body means has third valve fluid port means therein, said stationary valve face means having third fluid passage orifice means in constant communication with said third valve fluid port means, said rotary valve means in said first selectable position also having said second valve passage means in registration with said third fluid passage orifice means to connect said second and said third valve fluid port means in communication with each other.

3. The structure of claim 1, wherein said first end flange means engages said reaction wall means and said second end flange means engages said rotary reaction means.

4. The structure of claim 3, wherein said end flange means is axially resilient for urging said first rotary valve means against said stationary valve body means.

5. The structure of claim 3, wherein said first end flange means defines with said reaction wall means fluid pressure responsive means.

6. The structure of claim 3, wherein said bushing means comprises generally an H-shaped cross section.

7. The structure of claim 3, wherein said second end flange means has fluid recess means therein registerable with said valve passage means in said rotary valve means.

8. The structure of claim 1, wherein said actuating means includes shaft means for rotatively supporting said rotary valve means.

9. The structure of claim 8, wherein said shaft means and said rotary valve means have axially slidable connection means therebetween.

10. The structure of claim 1, wherein one of said valve face means has four fluid passage means and wherein the other has two fluid passage means, said two fluid passage means in said first selectable position respectively registering with two of said four fluid passage means and in said third selectable position respectively registering with the other two of said four fluid passage means.

11. The structure of claim 10, wherein said stationary valve face means includes said four fluid passage means and wherein said rotary valve face means includes said two fluid passage means.

12. The structure of claim 10, wherein said rotary valve face means includes said four fluid passage means and wherein said stationary valve face means includes said two fluid passage means.

* * * * *